United States Patent [19]

Van De Kerkhof et al.

[11] Patent Number: 5,661,755
[45] Date of Patent: Aug. 26, 1997

[54] ENCODING AND DECODING OF A WIDEBAND DIGITAL INFORMATION SIGNAL

[75] Inventors: Leon M. Van De Kerkhof; Arnoldus W. J. Oomen, both of Eindhoven, Netherlands

[73] Assignee: U. S. Philips Corporation, New York, N.Y.

[21] Appl. No.: 546,436

[22] Filed: Oct. 20, 1995

[30] Foreign Application Priority Data

Nov. 4, 1994 [EP] European Pat. Off. ............ 94203226

[51] Int. Cl.$^6$ .......................... H04B 14/04; H04B 14/06; H04B 1/66
[52] U.S. Cl. .......................... 375/242; 375/240; 375/245; 392/2.38
[58] Field of Search .................................. 375/242, 240, 375/245, 246, 253; 395/2.38, 2.39, 2.12, 2.14; 381/29–35

[56] References Cited

U.S. PATENT DOCUMENTS

| | | | |
|---|---|---|---|
| 5,214,678 | 5/1993 | Rault et al. | 375/122 |
| 5,260,980 | 11/1993 | Akagiri et al. | 375/242 |
| 5,323,396 | 6/1994 | Lokhoff | 370/94.1 |
| 5,365,553 | 11/1994 | Veldhuis et al. | 375/122 |
| 5,367,608 | 11/1994 | Veldhuis et al. | 395/2.38 |

FOREIGN PATENT DOCUMENTS

| | | | |
|---|---|---|---|
| 0402973A1 | 12/1990 | European Pat. Off. | G11B 20/10 |
| 0400755A1 | 12/1990 | European Pat. Off. | H04B 1/66 |
| 0457390A1 | 11/1991 | European Pat. Off. | G04B 1/66 |
| 0457391A1 | 11/1991 | European Pat. Off. | H04B 1/66 |

*Primary Examiner*—Stephen Chin
*Assistant Examiner*—Hai H. Phan
*Attorney, Agent, or Firm*—Richard A. Weiss

[57] ABSTRACT

An encoder apparatus is disclosed for encoding a wideband digital information signal. The apparatus comprises an input signal (1) for receiving the wideband digital information signal, a signal splitting unit (2) for splitting the wideband digital information signal into M narrow band sub signals ($SB_1$ to $SB_M$). The narrow bands all have a specific constant bandwidth. Further, a scale factor determining unit (6) for determining a scale factor for subsequent signal blocks in each of the sub signals, and a quantization unit (13) for quantizing the samples in a signal block into quantized samples are present. A bit allocation information deriving unit (34,41,48) is present for deriving bit allocation information, the bit allocation information being representative of the number of bits with which samples in a signal block of a sub signal will be represented after quantization in the quantization unit (13). A formatting unit (20) is present for combining the quantized samples in the signal blocks of the quantized sub signals and the scale factors into a digital output signal having a format suitable for transmission or storage. The apparatus further comprises a signal block length determining unit (30) for determining the lengths of the signal block in at least one of the sub signals and for generating block length information, the block length information being representative of the said lengths of the signal blocks of the said at least one sub signal, where the lengths of subsequent signal blocks in said at least one sub signal differ. The scale factor determining unit (6) now determines the scale factors for subsequent signal blocks of varying lengths in response to said block length information, the bit allocation information deriving unit (34,41,48) now derives bit allocation information for subsequent signal blocks of varying lengths in response to said block length information, and the quantization unit (13) now quantize the samples in signal blocks of varying lengths in response to said block length information. The formatting unit (20) further includes the block length information into the digital output signal for transmission or storage.

20 Claims, 6 Drawing Sheets

ENCODING AND DECODING OF A WIDEBAND DIGITAL INFORMATION SIGNAL

BACKGROUND OF THE INVENTION

The invention relates to an apparatus for encoding a wideband digital information signal, the apparatus comprising an input for receiving the wideband digital information signal, signal splitting means for, during a specific time interval, splitting the wideband digital information signal into M narrow band sub signals, each one of the M sub signals being representative of a component of the wideband digital information signal which is present in a corresponding one of M adjacent narrow bands in the frequency band of the wideband digital information signal, where M is an integer larger than 1 and the narrow bands all have a specific constant bandwidth, scale factor determining means for determining a scale factor for subsequent signal blocks in each of the sub signals, quantization means for quantizing the samples in a signal block into quantized samples in response to bit allocation information supplied to the quantizing means so as to obtain quantized sub signals, bit allocation information deriving means for deriving said bit allocation information, the bit allocation information being representative of the number of bits with which samples in a signal block of a sub signal will be represented after quantization in the quantization means, formatting means for combining quantized samples in the signal blocks of the quantized sub signals and scale factors into a digital output signal having a format suitable for transmission or storage, to an apparatus for decoding said coded digital signal so as to obtain a replica of said wideband digital information signal, and to a method for encoding the wideband digital information signal. The wideband digital information signal can be an wideband digital audio signal.

An encoding apparatus as defined in the opening paragraph is known from EP-A 457,390 and EP-A 457,391, to which U.S. Pat. Nos. 5,367,608 and 5,365,553 correspond the documents (D1) and (D2) respectively, in the list of references given below. More specifically, the powers in each of the subbands are calculated by squaring the sample values present in time equivalent signal blocks of the subband signals and summing the squared sample values in a time equivalent signal block. The signal blocks in the documents listed above are of constant length and are 12 samples long.

The powers thus obtained are processed in a processing step in which use is made of a psycho acoustic model so as to obtain masked threshold values. Another way of obtaining the masked threshold values is by carrying out separately a Fourier transform on the wideband digital information signal and applying the psycho acoustic model on the Fourier Transform results. The masked threshold values, together with the scale factor information, result in bitneeds $b_1$ to $b_M$ for the samples in the time equivalent signal blocks of the M subband signals. In a bitallocation step, those bitneed values are used so as to allocate bits to the samples, resulting in the bitallocation information values $n_1$ to $n_M$, $n_m$ indicating the number of bits with which the 12 samples in the signal block of subband m are represented, after having carried out a quantization on the samples in the subbands.

In the prior art encoding system, with a sampling frequency of 48 kHz, the total frequency band to be encoded is 24 kHz. This frequency band is split into 32 narrow bands of equal width, so that they have a constant width of 750 Hz each. The narrow bands may be substantially non-overlapping.

Investigations have resulted in the knowledge that especially in the lower frequency bands, the bandwidth is relatively broad so that, either a large number of bits is required to code the sub signals in that lower frequency bands because of the fact that in some cases the signal-to-mask ratio is large, or, if such large number of bits is not available, encoding errors may become audible upon decoding.

This problem can be solved by decreasing the bandwidth of the subbands, e.g. to half of the original bandwidth, that is to 375 Hz, so that now 64 sub signals will be available at the output of the signal splitting means.

SUMMARY OF THE INVENTION

The invention has for its object to provide an improved encoding apparatus and an improved encoding method so that a higher data reduction is possible, and the bitrate of the coded digital signal thus can be lower.

In accordance with the invention, the encoding apparatus is characterized in that the apparatus further comprises signal block length determining means for determining the lengths of the signal block in at least one of the sub signals and for generating block length information, the block length information being representative of the said lengths of the signal blocks in the at least one sub signal, where the lengths of subsequent signal blocks in said at least one sub signal differ, the scale factor determining means being further adapted to determine the scale factors for subsequent signal block of varying lengths in said at least one sub signal in response to said block length information, the bit allocation information deriving means being further adapted to derive bit allocation information for subsequent signal blocks of varying lengths in said at least one sub signal in response to said block length information, the quantization means being further adapted to quantize the samples in signal blocks of varying lengths in said at least one sub signal in response to said block length information, and the formatting means further being adapted to include the block length information into the digital output signal for transmission or storage. The invention is based on the recognition that the wideband digital information signal may sometimes be of non-stationary character. In that situation, signal transients of short duration are included in the wideband digital signal and are surrounded by signal parts in the wideband digital signal being stationary.

More generally, within M time equivalent signal blocks, one in each of the M sub signals, the bitneed in one or more of the signal blocks may change in time. When encoding the group of M time equivalent signal blocks as a whole, the bitneed chosen for each signal block must account for the worst situation, that is: the highest bitneed in said signal block. As a result, a larger number of bits will be allocated than in a situation where the signal blocks would have been divided into smaller portions, and where the encoding process would have been applied separately on each of the time equivalent signal portions.

In accordance with the invention, the length of signal blocks in at least one of the sub signals is now made variable, whilst having obtained the sub signals in the well known way. More specifically, the lengths of subsequent signal blocks in said at least one sub signal is adapted such that, in a situation where the character of the wideband digital signal changes from having a more or less stationary character into having a non-stationary character, the blocks lengths in the said at least one sub signal are decreased, and that, if the character of the wideband digital signal changes from having a non-stationary character into having a more or less stationary character, the block lengths in the said at least one sub signals are increased.

The decision regarding the lengths of the signal blocks in the at least one sub signal can also be realized by investigation the character of the sub signal itself, whether the sub signal is stationary or non-stationary. Or, the signal-to-mask ratio in a sub signal can be investigated to see whether the it is more or less stationary or non-stationary as a function of time.

It will be clear that, the information identifying the block lengths is required for realizing the scale factor determination, the bit allocation and the subsequent quantization. Further, the information identifying the block lengths must be transmitted or stored so as to enable an inverse decoding upon reception or reproduction.

Various modifications as regards the variation in the block length for the subsequent signal blocks in all or some of the subbands are discussed and described hereinafter.

The corresponding decoder apparatus is the subject of the claims 13 to 15. Further, claims are directed to an encoding method.

BRIEF DESCRIPTION OF THE DRAWINGS

These and other objects of the invention will be further elucidated in the following figure description, in which.

DESCRIPTION OF THE PREFERRED EMBODIMENTS

Figure 1:
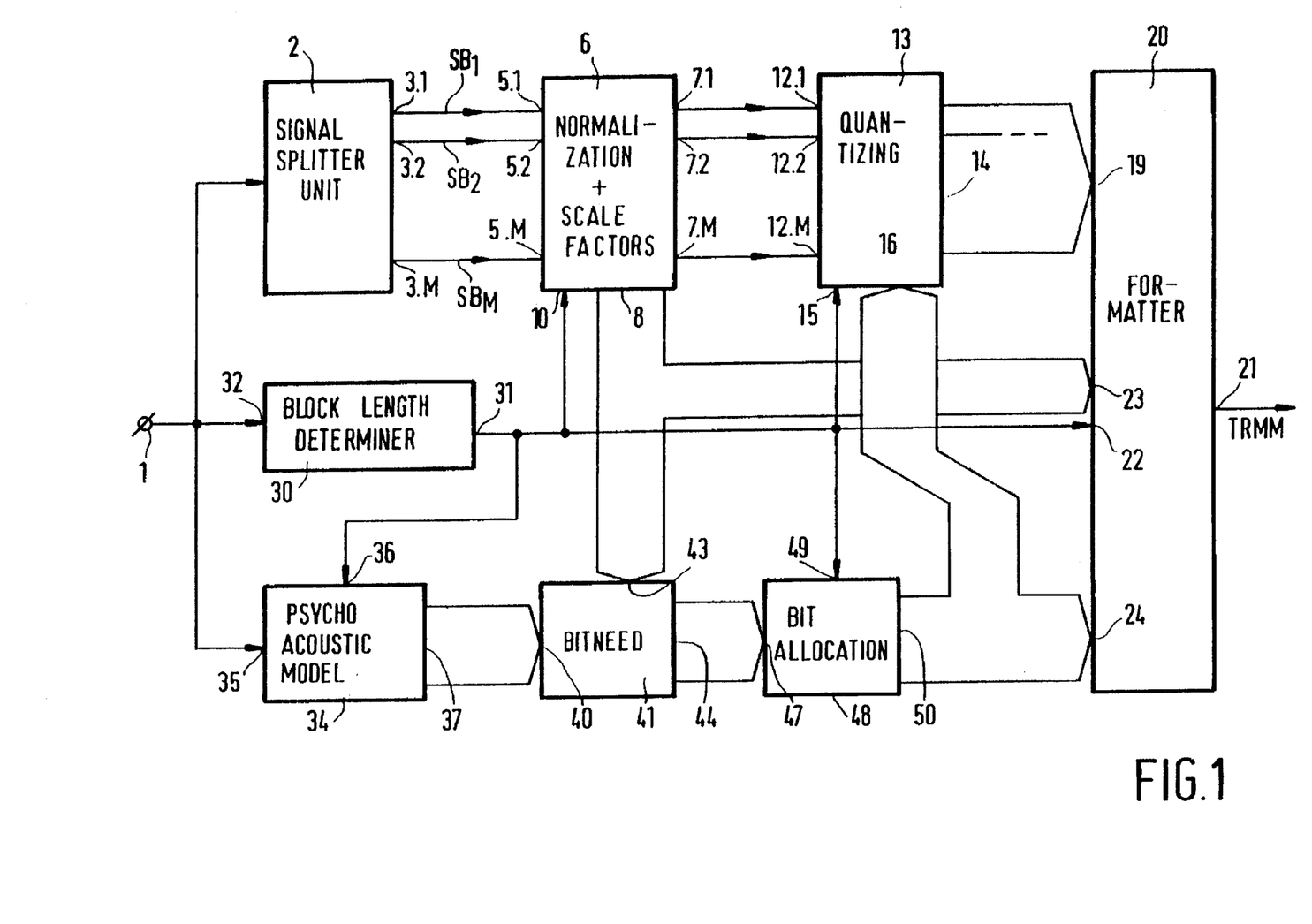
FIG. 1 shows an embodiment of the encoder apparatus.

FIG. 1 shows an encoder apparatus comprising an input terminal 1 for receiving a wideband digital information signal, such as a wideband digital audio signal, sampled with a sampling rate of 44.1 or 48 kHz. The wideband digital signal is supplied to a subband splitter unit 2 in which the wideband digital signal is subjected to a filtering. In the present example, the splitter unit 2 divides the total frequency band of 48 kHz into M(=64) substantially non-overlapping subbands of constant bandwidth. The subbands have a bandwidth of 375 Hz each. As a result M(=64) subband signals $SB_1$ to $SB_M$ are derived at the outputs 3.1 to 3.M of the splitter unit 2. The sampling rate of the subband signals has been down convened in the splitter unit 2 by a factor of M, so that the total data rate at the output of the splitter unit 2 equals the data rate of the wideband digital signal received at the input 1. Embodiments of a splitter unit can be found in EP-A 400,755, to which U.S. Pat No. 5,214,678 corresponds. More specifically, a signal portion of a specific length of the wideband digital signal, obtained by windowing the wideband digital signal with a time window of said specific length, is applied to the input of the splitter unit 2 and results in one sample at each of the outputs 3.1 to 3.M of the splitter unit 2. Next, the time window is shifted in time over a short time period and the signal portion of the wideband digital signal now obtained results in the next one sample at each of the outputs of the splitter unit 2. Subsequent time windows shifted over said short time period will overlap. All time windows have the same length.

The subband signals $SB_1$ to $SB_M$ are supplied to inputs 5.1 to 5.M respectively of a scale factor and normalization unit 6. The unit 6 determines for each signal block in a subband signal and for the signal blocks in all the subband signals a scale factor. This scale factor has a relation to the largest sample value of the signal block. Further, normalization is carried out by dividing the samples in a signal block by its corresponding scale factor. As a result, normalized subband signals are applied to the outputs 7.1 to 7.M, one normalized subband signal for each of the subbands, and the scale factors, one for each signal block in each subband signal, are supplied to an output 8. More specifically, the value range of the normalized samples is divided into 64 subranges if the scale factor is a 6-bit digital number and the scale factor for a signal block represents the level of the range which is the next higher to the highest sample value in the signal block. The division of the serial datastream of at least one of the subband signals into subsequent signal blocks is realized in response to a block length information signal applied to an input 10 of the unit 6. The block length information signal, as well as the division of the serial datastream of the at least one subband signal into subsequent subband signal blocks in response to said block length information signal, will be explained later. It should however be noted here that the division into varying signal block lengths is carried out on the at least one subband signal and that the time window length defined above, and defining the signal portion of the wideband digital signal from which each time one sample of each of the subband signals are derived at the outputs 3.1 to 3.M, is not varied.

The M normalized subband signals are supplied to inputs 12.1 to 12.M respectively of a quantization unit 13. In response to bitallocation information supplied to an input 16 and the block length information signal applied to an input 15, the quantizer unit 13 quantizes the signal blocks of the M normalized subband signals by representing the samples in a signal block of the normalized subband signal $SB_m$ by $n_m$ bits per sample so as to obtain quantized samples in said signal block.

The M quantized subband signals are supplied to corresponding sub outputs of an output 14 and are subsequently applied to an input 19 of a formatting unit 20. The formatter unit 20 further receives the block length information signal via an input 22, the scale factors via an input 23 and the bitallocation information via an input 24. The formatter unit 20 combines the signals into a serial datastream, carries out a channel encoding, if necessary, so as to convert the serial datastream into a coded digital signal suitable for transmission via transmission medium TRMM, or for recording on a transmission medium in the form of a record carrier. Reference is made to EP-A 402,973, to which U.S. Pat. No. 5,323,396 corresponds, which shows a prior art formatter unit 20. The formatter unit described there must be adapted such that it is capable of receiving the block length information signal as well, so that the transmission of such block length information signal in the format of the transmitted signal is possible. It is however within the capabilities of the skilled man to realize such transmission, so that no further description of the transmission of the transmission signal will be given.

The apparatus further comprises a block length determining unit 30, to be discussed later, that supplies the block length information signal to an output 31 in response to the wideband digital signal applied to an input. Further, a unit 34, to be discussed later, is present that derives masked threshold information for each signal block in the subband signals in response to the wideband signal applied to an input 35 and the block length information signal applied to an input 36, and supplies the masked threshold information to an output 37. This output 37 is coupled to an input 40 of a bitneed determining unit 41, to be discussed later, that generates, in response to the masked threshold information applied to the input 40 and the scale factor information applied to an input 43, bitneed information $b_m$ for each signal block in a subband signal $SB_m$. The bitneed information is supplied to an output 44. The output 44 is coupled to an input 47 of a bitallocation unit 48, to be discussed later, that generates the bitallocation information $n_m$ introduced above for each signal block in a subband signal $SB_m$, in response to the bitneed information applied to the input 47 and the block length information signal applied to an input 49. The bitallocation information is supplied to an output 50.

Each subband signal $SB_m$ generated by the splitter unit 2 comprises subsequent samples lying equidistantly along a time axis. The serial datastreams of the subband signals are divided into signal blocks so as to enable normalization and quantization. In the prior art those signal blocks have a constant length of e.g. 12 samples in each of the subband signals. In other applications, another number of samples (36) in a signal block is chosen for quantization, see "The ISO/MPEG-audio codec: a generic standard for coding of high-quality digital audio", by K. Brandenburg et al, preprint No 3336 of the 92nd AES Convention in Vienna, March 1992.

Figure 2:
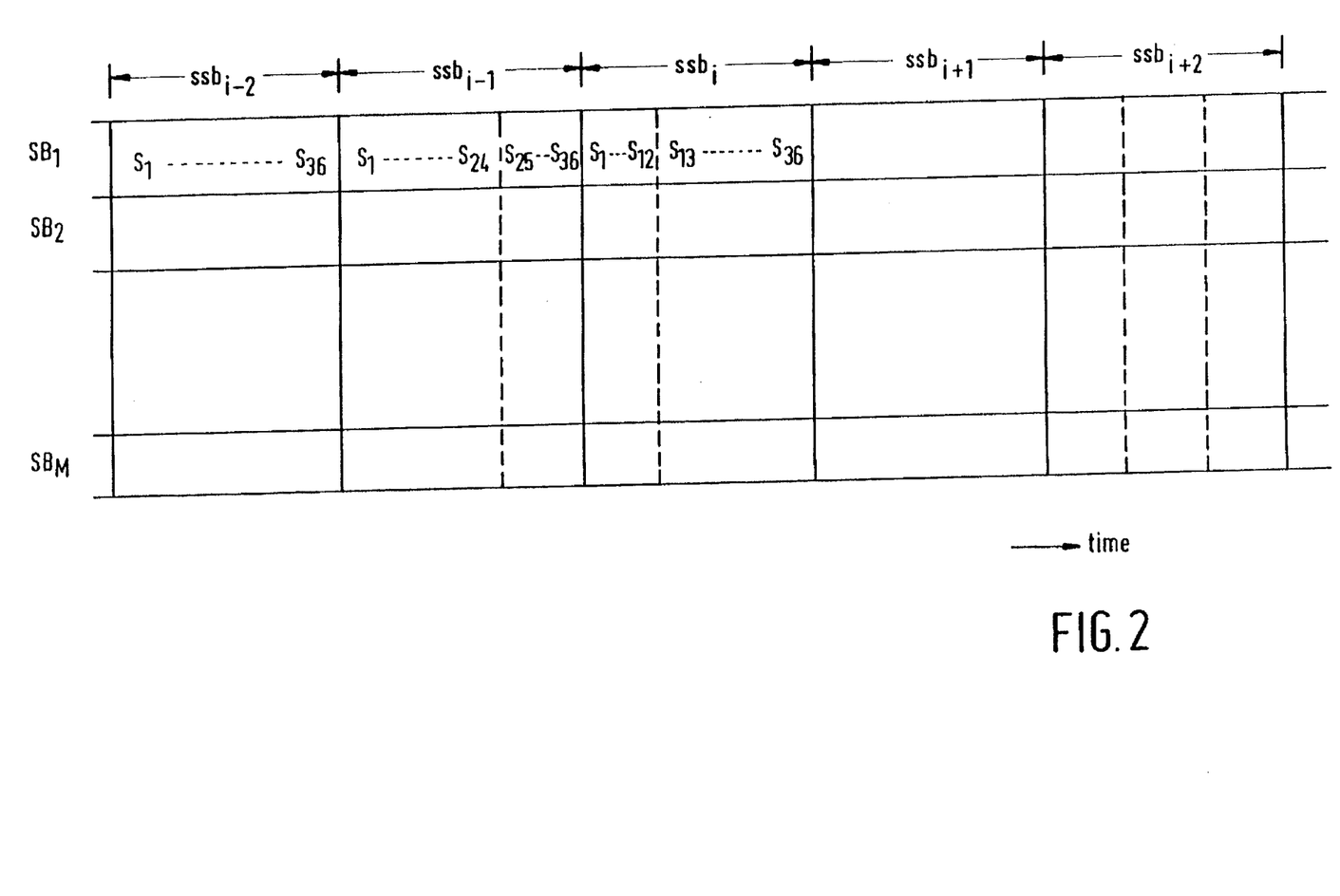
FIG. 2 shows the serial datastreams of the subband signals divided into time equivalent super signal blocks of the same length, where time equivalent super signal blocks may have been divided into time equivalent signal blocks of equal length.

In accordance with the invention, the signal blocks in at least one of the subband signals are of varying length. FIG. 2 shows one embodiment, showing the serial datastreams of the subband signals $SB_1$ to $SB_M$ schematically as horizontal rows as a function of time. First the serial datastreams are divided into subsequent super signal blocks of constant length and comprising, in the present example, 36 subsequent samples $s_1$ to $s_{36}$ in a subband signal. The super signal blocks are denoted by ... $ssb_{i-2}$, $ssb_{i-1}$, $ssb_i$, $ssb_{i+1}$, ... Each subband signal is thus built up of a sequence of subsequent super signal blocks.

At least some of the super signal blocks in at least one sub signal will be divided into at least two signal blocks or super signal blocks may remain undivided. More specifically, at least some of the signal blocks in at least two sub signals will be divided into at least two signal blocks, whilst other super signal blocks in the at least two sub signals may remain undivided. The signal blocks may be time equivalent, which means that they occur at the same moment in time. As a consequence, time equivalent signal blocks have the same length. The embodiment now further discussed is capable of subdividing time equivalent super signal blocks into three signal blocks having 12 samples each, or into two signal blocks one of which has 12 samples and the other has 24 samples, or leaving the super signal blocks undivided.

FIG. 2 shows how the time equivalent super signal blocks $ssb_{i-2}$ in the subband signals $SB_1$ to $SB_M$ and the time equivalent super signal blocks $ssb_{i+1}$ have remained undivided. The time equivalent super signal blocks $ssb_{i-1}$ have been divided into two signal blocks, the first signal block in the super signal block $ssb_{i-1}$ in a subband signal having the samples $s_1$ to $s_{24}$ of the super signal block and the second signal block in the said super signal block having the samples $s_{25}$ to $s_{36}$ of the super signal block. The time equivalent super signal blocks $ssb_i$ have also been divided into two signal blocks, the first signal block in the super signal block $ssb_i$ in a subband signal having the samples $s_1$ to $s_{12}$ of the super signal block and the second signal block in the said super signal block having the samples $s_{13}$ to $s_{36}$ of the super signal block. The time equivalent super signal blocks $ssb_{i+2}$ have been divided into three signal blocks, the first signal block in the super signal block $ssb_{i+2}$ in a subband signal having the samples $s_1$ to $s_{12}$ of the super signal block, the second signal block in the said super signal block having the samples $s_{13}$ to $s_{24}$ of the super signal block and the third signal block in the said super signal block having the samples $s_{25}$ to $s_{36}$.

Figure 3:
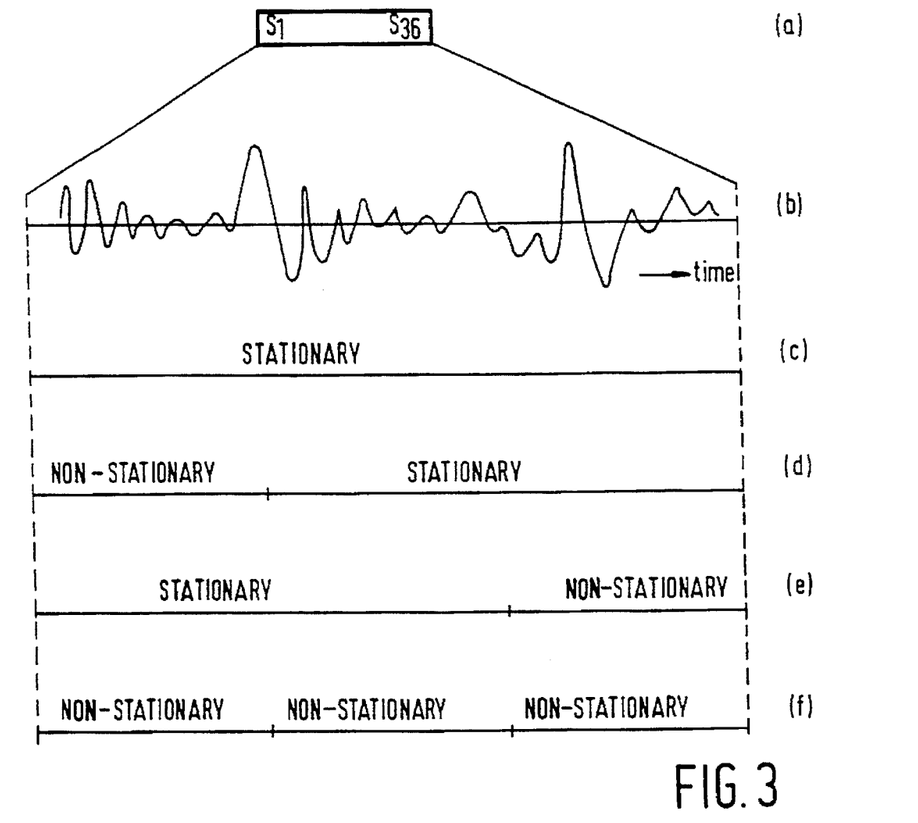
FIG. 3 shows the wideband digital signal being divided into stationary and non-stationary signal portions.

The decision process so as to realize the division of the super signal blocks, is further explained using FIG. 3. FIG. 3 shows in (a) one of the time equivalent super signal blocks in a subband signal. The M time equivalent super signal blocks are formed in the splitter unit 2, and have been derived from a signal portion of the wideband digital information signal that extends over a certain period of time. This signal portion of the wideband digital information signal is shown in (b) of FIG. 3. By investigating that signal portion of the wideband digital information signal, one can come to the conclusion that the signal portion can be characterized as being a stationary signal portion.

The block length determiner can derive for subsequent short time portions of the wideband digital signal, those short time portions being short in relation to the length of the time interval shown in (b) of FIG. 3, a masking curve, this curve indicating the masking level over the total frequency band resulting from the wideband digital signal in a short time portion. If the masking curve does not change very much for subsequent short time portions, it can be concluded that the wideband digital signal is stationary, whereas, if the masking curve changes relatively much for subsequent short time portions, the wideband digital signal is considered to have a non-stationary character. The derivation of the masking curve will be explained later.

In the situation that the signal is considered stationary, one will decide not to divide the time equivalent super signal blocks, as the bitallocation information required for a correct quantization of the samples in the super signal block, that is: the number of bits required to represent the quantized samples, will roughly be the same for all the 36 samples in a super signal block.

Suppose now, that the first part of the signal portion shown in (b) of FIG. 3 has a non-stationary character, and the remaining part is more or less stationary. This is indicated in (d) of FIG. 3. It will be understood that the non-stationary part requires more bits per sample than the stationary part of the signal portion. Therefore, the time equivalent super signal blocks will all be divided into two signal blocks, such that the first signal block in each of the time equivalent super signal blocks has 12 samples and the second signal block in each of the time equivalent super signal blocks has 24 samples.

Figure 4A:
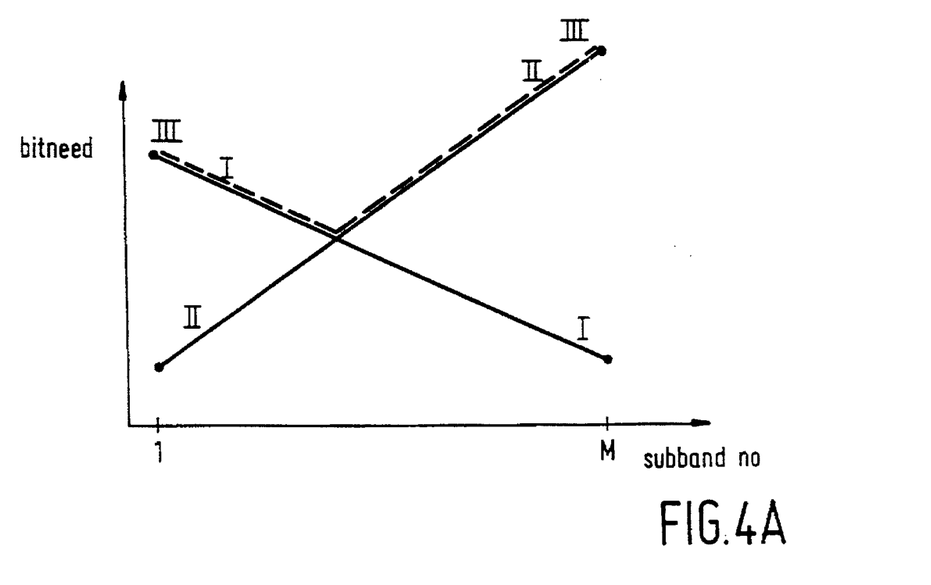
FIG. 4A shows the bitneeds for two signal portions of the wideband digital information signal.

The example of (d) of FIG. 3 can also be explained in another way. Suppose that the curve I—I in FIG. 4A shows the bitneed for the various subbands that is required for the first (indicated as non-stationary) signal portion shown in (d) of FIG. 3 and that the curve II—II in FIG. 4A shows the bitneed for the various subbands that is required for the second (indicated as stationary) signal portion shown in (d) of FIG. 3. If the signal shown in (d) of FIG. 3 would have been encoded as a whole, a bitneed indicated by the broken curve III—III would have been needed. Contrary to this, when encoding the first and the second signal portion in (d) of FIG. 3 separately, the bitneed curve I—I is required for the first signal portion and the bitneed curve II—II is required for the second signal portion in (d) of FIG. 3. As a consequence less bits are needed for the encoding of the separate signal portions.

Suppose now, that the final part of the signal portion shown in (b) of FIG. 3 has a non-stationary character, and the remaining part is more or less stationary. This is indicated in (e) of FIG. 3. For the same reason as given above, it will be understood that the time equivalent super signal blocks will all be divided into two signal blocks, such that the first signal block in each of the time equivalent super signal blocks has 24 samples and the second signal block in each of the time equivalent super signal blocks has 12 samples.

In the situation where the signal portion shown in (b) of FIG. 3 has a non-stationary character over the total time interval of the signal portion, as schematically indicated by (f) of FIG. 3, it will be understood that the time equivalent super signal blocks will be divided into three equally long signal blocks of 12 samples each.

The decision process described with reference to FIG. 3 is carried out by the block length determining unit 30. In response to the subsequent signal portions in the wideband digital information signal from which each time the time equivalent super signal blocks are derived, and dependent of whether a signal portion has one of the characteristic behaviours as schematically given by (c), (d), (e) or (f) in FIG. 3, the unit 30 generates the block length information signal at its output 31. This block length information signal could be a 2-bit signal capable of identifying one of the four situations described with reference to FIG. 3.

In response to the 2-bit block length information signal, the unit 6 knows if and how to subdivide the super signal blocks and derives for each signal block a scale factor and derives a scale factor for the non-divided super signal blocks. Normalization is carried out on each signal block and each non-divided super signal block, using the scale factors.

In response to the 2-bit block length information signal applied to the units 34 and 48, the units 34, 41 and 48 can process each group of M time equivalent signal blocks (of either 12, 24 or 36 samples in the signal blocks) in the way as described in the (EP-A 457,390 and EP-A 457,391 (to which U.S. Pat. Nos. 5,307,608 and 5,365,553 correspond, respectively) so as to obtain the bit allocation information.

That means that the unit 34 may comprise a splitter unit as well, or may receive the output signals of the splitter 2. The unit 34 calculates the signal powers $v_m$ by squaring the sample values in the signal blocks of a subband signal $SB_m$ and summing the squared sample values. By means of a matrix manipulation carded out on the M signal powers $v_m$, magnitudes $w_m$ can be derived being representative of the masking curve in the time equivalent signal blocks of the subband signals $SB_1$ to $SB_M$.

Those magnitudes $w_m$ are supplied to the unit 41, which derives the bitneeds $b_m$ in response to the magnitudes $w_m$ and the scale factors. Those bitneeds $b_m$ are supplied to the unit 48. In response to the bitneeds received, the unit 48 derives the bitallocation information therefrom, using the block length information signal by allocating bits to the samples in the time equivalent signal blocks from a bitpool having a certain number of bits B.

It should be noted that it is known what the bitrate required for transmitting the quantized subband signal samples is. It is assumed that this bitrate is x kbit/s, where x may be for example 128. This means that for each millisecond of the wideband digital signal, 128 bits are available in the bitpool for allocation purposes. As a result, when allocating bits to time equivalent signal blocks comprising 12 samples and having a length of y milliseconds, 128.y bits are available in the bitpool for allocation purposes. Consequently, for time equivalent signal blocks having 24 samples in each signal block, 256.y bits are available in the bitpool, and for time equivalent super signal blocks 384.y bits are available in the bitpool for allocation purposes.

In response to the 2-bit block length information signal, the unit 13 knows if and how to subdivide the super signal blocks of normalized samples and quantizes the samples in each signal block (or each non-divided super signal block) in a subband signal $SB_m$ in accordance with the corresponding bitallocation value $n_m$ received via the input 16.

Another way of deriving the masking curve in the unit 34, is to carry out a Fourier transform on a signal portion of the wideband digital signal that corresponds to a group of time equivalent signal blocks of the sub signals, so as to obtain a power spectrum of the wideband digital signal. The frequency components of the power spectrum in each of the subbands are combined so as to obtain one composite frequency component in each of the subbands and the masking level in each of the subbands is derived from the composite frequency components in each of the subbands. Or, the frequency components of the power spectrum in each subband are used to derive the masking level in the said subband.

It will be clear that, where the block length determining unit 30 and the unit 34 use a Fourier transform for deriving the masking level, those two units may share the component that realizes the Fourier transform on the wideband digital signal.

Figure 4B:
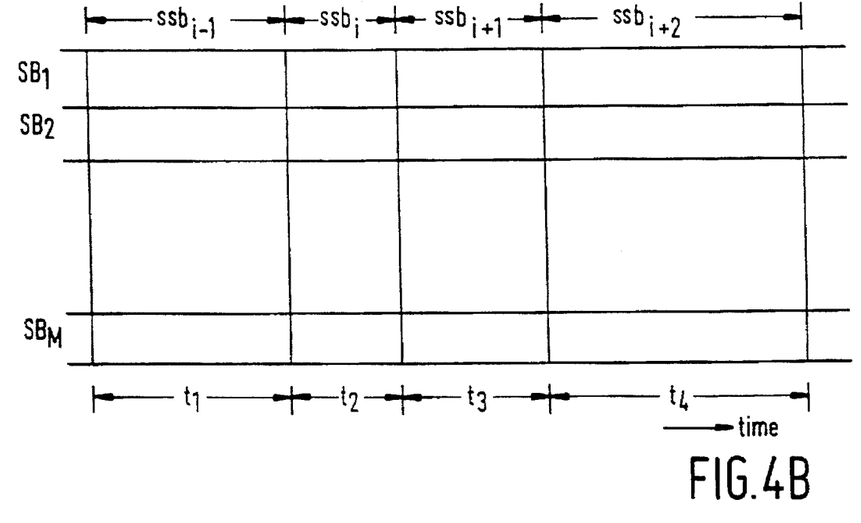
FIG. 4B shows the serial datastreams of the subband signals divided into time equivalent signal blocks of varying length.

In another embodiment, the block length determining unit 30 is capable of dividing the serial datastreams of the subband signals in signal blocks of varying length, again in dependence of the character of the wideband digital information signal. The smaller the non-stationary part in the wideband digital information signal, the smaller can be the length of the time equivalent signal blocks in which that non-stationary part 'falls' after subband splitting. Not only the length of time equivalent signal blocks can be chosen, but also the moment of occurrence in time of those time equivalent signal block can be chosen. FIG. 4B shows schematically an example of the division of the serial datastreams of the M subband signals into time equivalent signal blocks $ssb_{i-1}$, $ssb_i$, $ssb_{i+1}$ and $ssb_{i+2}$, where the length in time of those time equivalent signal blocks are $t_1$, $t_2$, $t_3$ and $t_4$ respectively. As long as the time equivalent signal blocks have the same length, the working of the various units in the embodiment of FIG. 1 are the same as explained above for the division into signal blocks as given in FIGS. 2 and 3, with the exception that the block length information signal will be require more bits so as to identify the various block lengths.

It has been explained above, that the block length determining unit may derive for subsequent short time portions of the wideband digital signal, those short time portions being short in relation to the length of the time interval shown in (b) of FIG. 3, a masking curve, this curve indicating the masking level over the total frequency band resulting from the wideband digital signal in a short time portion. If the masking curve does not change very much for subsequent short time portions, it can be concluded that the wideband digital signal is stationary, whereas, if the masking curve changes relatively much for subsequent short time portions, the wideband digital signal is considered to have a non-stationary character. It will further be appreciated that such short time portion of the wideband digital signal is related to a signal block of specific length in all of the subband signals. The lengths of the signal blocks shown in FIG. 4B may now be equal to integer multiples of the said signal block of specific length.

Figure 5:
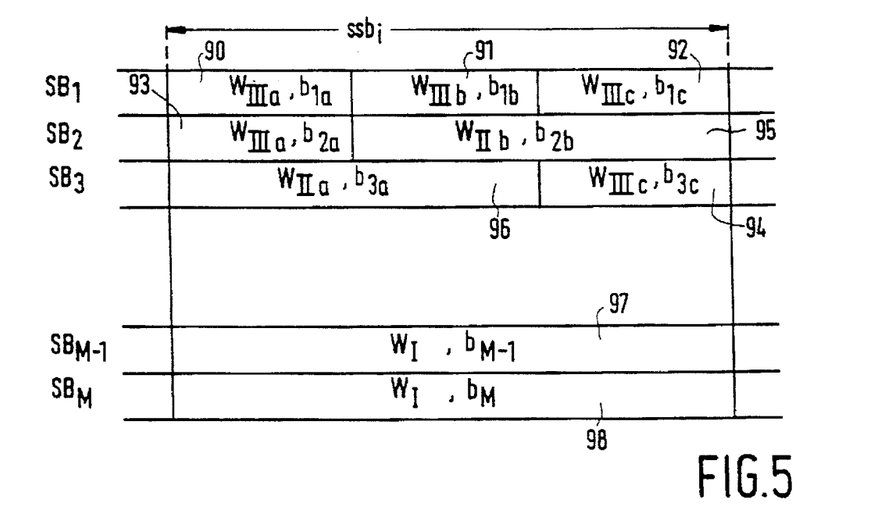
FIG. 5 shows the serial datastreams of subband signals divided into time equivalent super signal blocks, where super signal blocks of the said time equivalent super signal blocks may be divided into signal blocks of different length.

It should be noted that it may be possible to divide the serial datastreams of the subband signals in signal blocks of different lengths. This will be explained with reference to FIG. 5. FIG. 5 shows schematically one group of time equivalent super signal blocks $ssb_i$ in the subband signals $SB_1$ to $SB_M$. Again, it is assumed, as in FIG. 2, that the super signal blocks may be divided in one, two or three signal blocks, or that they remain undivided. It is clear from FIG. 5 that the super signal blocks in the subband signals $SB_M$ and $SB_{M-1}$ are not divided, that the super signal block in the subband signal $SB_3$ is divided into a first signal block of a larger length than the second signal block, the super signal block in the subband signal $SB_2$ is divided into a first signal block of shorter length than the second signal block and that the super signal block in the subband signal $SB_1$ is divided into three signal blocks. More specifically, but this should not be considered as a limitation of the invention, the smaller signal blocks have the same length of ⅓ of the length of the super signal blocks and the longer signal blocks have a length of ⅔ of the length of the super signal block.

The decision process how the different divisions into signal blocks for the various super signal blocks of the group of time equivalent super signal blocks is realized will be explained hereafter.

It has been explained above, that the block determining unit 30 may derive a masking curve from short time portions of the wideband digital signal, those short time portions being relatively short compared to the length of the time signal portion of the wideband digital signal shown in (c) of FIG. 3. The masking curve results in masking levels for each of the subband signals $SB_1$ to $SB_M$. The unit 30 may determine for each subband whether the masking level in a subband is relatively stationary as a function of time, or not. From FIG. 5 it is clear that the subband signal $SB_1$ in the subband 1 is relatively non-stationary, so that the super signal block has been divided into three signal portions. In subband 2, the subband signal $SB_2$ is relatively non-stationary in the first (⅓) part and relatively stationary in the second (⅔) part of the super signal block. In subband 3, the subband signal $SB_3$ is relatively stationary in the first (⅔) part and relatively non-stationary in the second (⅓) part of the super signal block. The subband signals $SB_{M-1}$ and $SB_M$ are relatively stationary in the whole super signal block, so that they are not divided.

Figure 6:
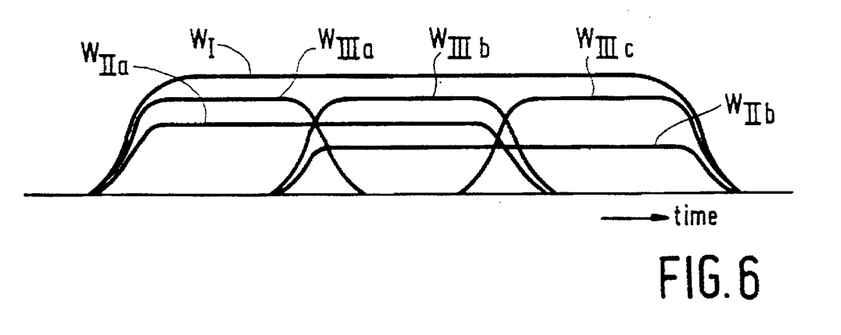
FIG. 6 shows time windows used for deriving the masking curve for the various signal blocks.

The derivation of the bitneeds for the various signal blocks shown in FIG. 5 is done in the following way. FIG. 6 shows, as a function of time, time windows used for deriving the bitneeds. The time windows can be in the form of Hanning windows. The time window $W_I$ in FIG. 6 is applied to the wideband digital signal and used for deriving the bitneeds for the time equivalent super signal blocks $ssb_i$ of all the subband signals. The time window $W_{IIIa}$ is applied to the wideband digital signal and used for deriving the bitneeds of time equivalent signal block, such as the signal blocks 90 and 93, as if the time equivalent super signal block $ssb_i$ of all the subband signals were all divided so as to obtain time equivalent signal blocks comprising the first 12 samples of the time equivalent super signal block. The time window $W_{IIIb}$ is applied to the wideband digital signal and used for deriving the bitneeds of time equivalent signal blocks, such as the signal block 91, as if the time equivalent super signal blocks $ssb_i$ of all the subband signals were all divided so as to obtain time equivalent signal block comprising the second 12 samples of the time equivalent super signal blocks. The time window $W_{IIIc}$ is applied to the wideband digital signal and used for deriving the bitneeds of time equivalent signal blocks, such as the signal blocks 92 and 94, as if the time equivalent super signal blocks $ssb_i$ of all the subband signals were all divided so as to obtain time equivalent signal blocks comprising the third 12 samples of the time equivalent super signal blocks. The time window $W_{IIa}$ is applied to the wideband digital signal and used for deriving the bitneeds of time equivalent signal blocks, such as the signal block 96, as if the time equivalent super signal block $ssb_i$ of all the subband signals were all divided so as to obtain time equivalent signal blocks comprising the first 24 samples of each of the time equivalent super signal blocks. The time window $W_{IIb}$ is applied to the wideband digital signal and used for deriving the bitneeds of time equivalent signal blocks, such as the signal block 95, as if the time equivalent super signal block $ssb_i$ of all the subband signals were all divided so as to obtain time equivalent signal blocks comprising the last 24 samples of each of the time equivalent super signal blocks. The units 34 and 41 now derive the bitneeds $b_{M-1}$ and $b_M$ from the bitneed calculation using the window $W_I$, derive the bitneed $b_{3a}$ for the signal block comprising the first 24 samples of the super signal block $ssb_i$ in the subband signal $SB_3$ from the bitneed calculation using the window $W_{IIa}$, derive the bitneeds $b_{1a}$ and $b_{2a}$ for the signal blocks comprising the first 12 samples of the super signal blocks $ssb_i$ in the subband signals $SB_1$ and $SB_2$ from the bitneed calculation using the window $W_{IIIa}$, derive the bitneed $b_{1c}$ and $b_{3c}$ for the signal blocks comprising the last 12 samples of the super signal blocks $ssb_i$ in the subband signals $SB_1$ and $SB_3$ from the bitneed calculation using the window $W_{IIIc}$, derive the bitneed $b_{2b}$ for the signal block comprising the last 24 samples of the super signal block $ssb_i$ in the subband signal $SB_2$ from the bitneed calculation using the window $W_{IIb}$ and derive the bitneed $b_{1b}$ for the signal block comprising the second 12 samples of the super signal block $ssb_i$ in the subband signal $SB_1$ from the bitneed calculation using the window $W_{IIIb}$.

Again, when knowing the bitrate, which is 128 kbit/s in the previous example, it is explained above that for each millisecond of the wideband digital signal, 128 bits are available in the bitpool for allocation purposes. As a result, for the M time equivalent super signal blocks $ssb_i$ of FIG. 5 a total number of 384.y bits is available for allocation purposes.

Bitallocation can be realized in the well known way of documents D1 and D2. That is: determine the signal block having the highest bitneed and allocate a number of bits to each sample in said signal block. If this allocation is the first allocation of bits to the samples in that signal block, a number of e.g. 2 bits are allocated to each sample of the signal block. If this allocation is not the first allocation of bits to the samples in said signal block, a lower number of bits (1) are allocated to the samples in said signal block. Further, the number of bits available in the bitpool is decreased with the number of bits allocated in total to the samples in said signal block. Next, this procedure is repeated, until all the bits in the bitpool have been allocated. The difference with the known allocation algorithm is that in the known algorithm, the number of samples in the signal blocks was constant, whereas in the present situation, this is not the case anymore.

Figure 7:
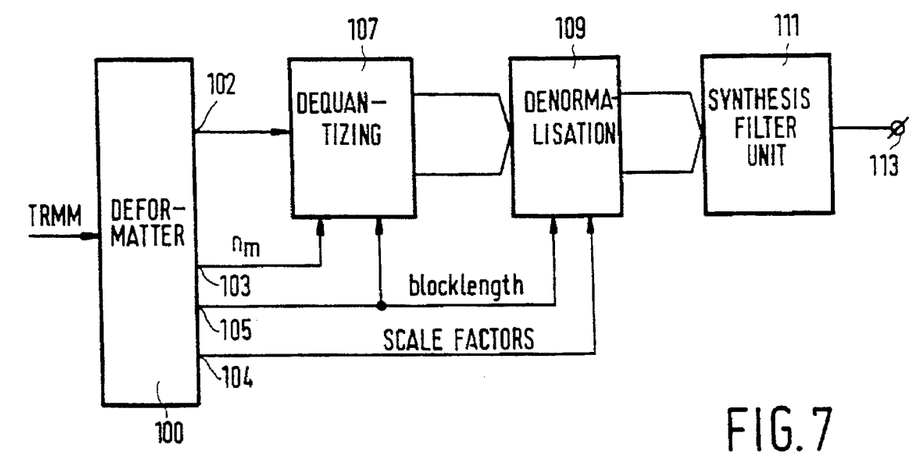
FIG. 7 shows an embodiment of a decoder apparatus for decoding the coded signal generated by the encoder apparatus of FIG. 1.

FIG. 7 shows schematically a decoding apparatus for receiving the coded digital signal transmitted via the transmission medium (record carrier) TRMM and decoding the coded digital signal so as to obtain a replica of the wideband digital information signal. The coded digital signal is supplied to a deformatting unit 100. The deformatting unit 100 is capable of retrieving from the serial datastream of the coded digital signal the quantized samples and for supplying the quantized samples to an output 102, for retrieving the bitallocation information and supplying the bitallocation information to an output 103, for retrieving the scale factor information and supplying the scale factor information to an output 104, and for retrieving the block length information signal and for supplying the block length information signal to an output 105.

The quantized samples as well as the bitallocation information and the block length information signal are supplied to a dequantizing unit 107. In response to the bitallocation information, the unit 107 retrieves from the serial datastream of the quantized samples, the quantized samples for each subband signal and arranges them in signal blocks of a length determined by the block length information signal so as to obtain the dequantized normalized subband signals. The dequantized normalized subband samples are supplied to a normalisation unit 109, together with the block length information signal and the scale factor information. In response to the scale factor information, the unit 109 denormalizes signal blocks of the normalized dequantized subband samples in accordance with the block length information signal by multiplication of the normalized dequantized samples by the scale factor corresponding to the signal block in a specific dequantized subband signal. The signals thus obtained are applied to a synthesis filter unit 111, which combines the signals so as to obtain a replica of the wideband digital information signal at an output 113.

Figure 8:
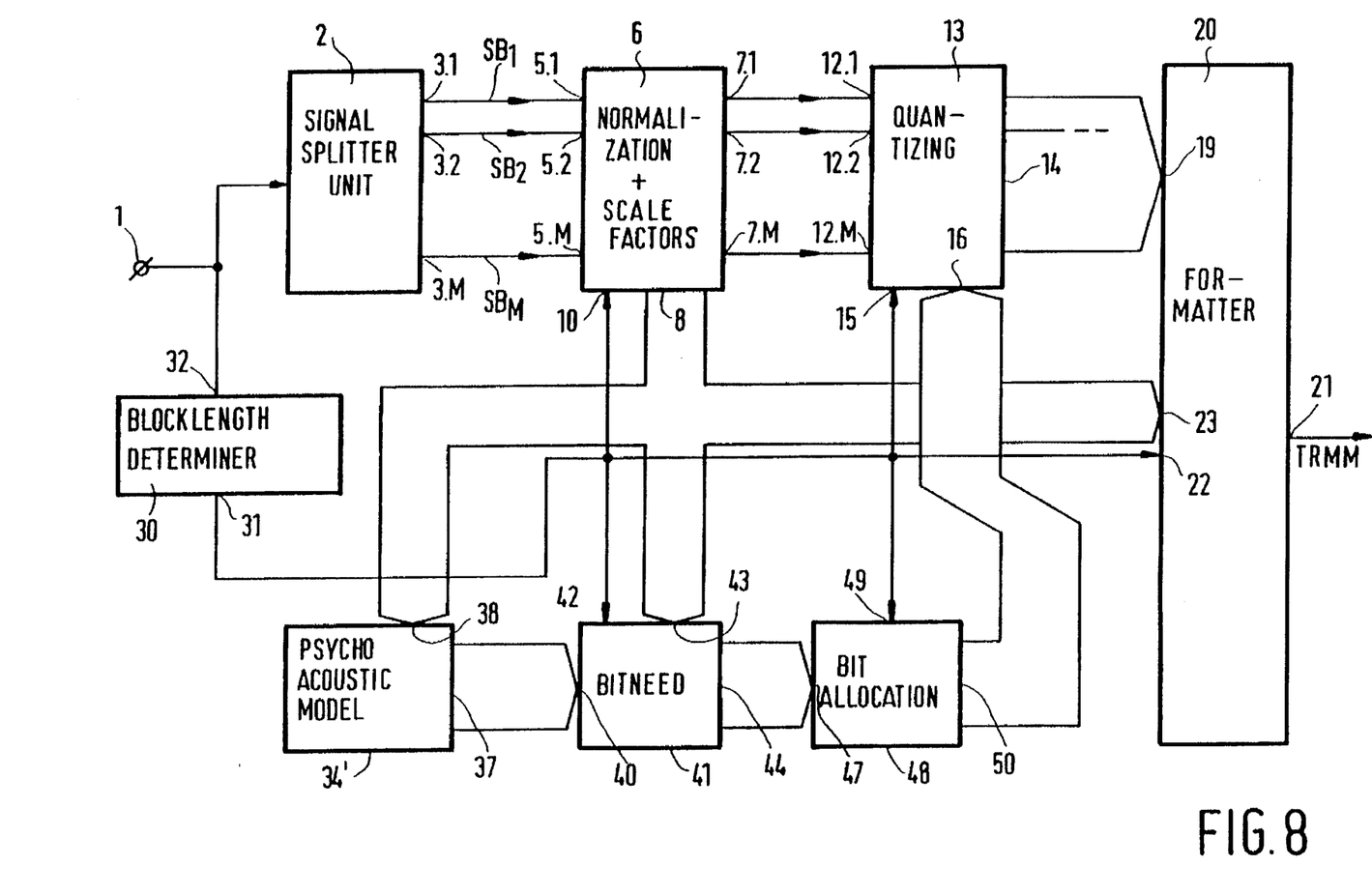
FIG. 8 shows another embodiment of the encoder apparatus and FIG. 9 shows a corresponding decoder apparatus.

FIG. 8 shows another embodiment of the encoding apparatus. The encoding apparatus shows a large resemblance with the encoding apparatus of FIG. 1. The difference with the encoding apparatus of FIG. 1 lies in the fact that the bitallocation information generated by the bitallocation information unit 48 is not transmitted or stored. Further, the masking curve determining unit 34' is of a different construction. The bitallocation information is now calculated in the units 34', 41 and 48, using the scale factors only. More specifically, the unit 34' calculates a power spectrum now on the basis of the scale factors applied to the input 38, instead of using the sum of the squares of the sample values in the signal portions, and derives therefrom in the standard way the masking curve. This curve is applied to the bitneed determining unit 41 so as to derive the bitneeds in the well known way. In response to these bitneeds, the unit 48 derives the bit allocation information in a well known way.

Figure 9:
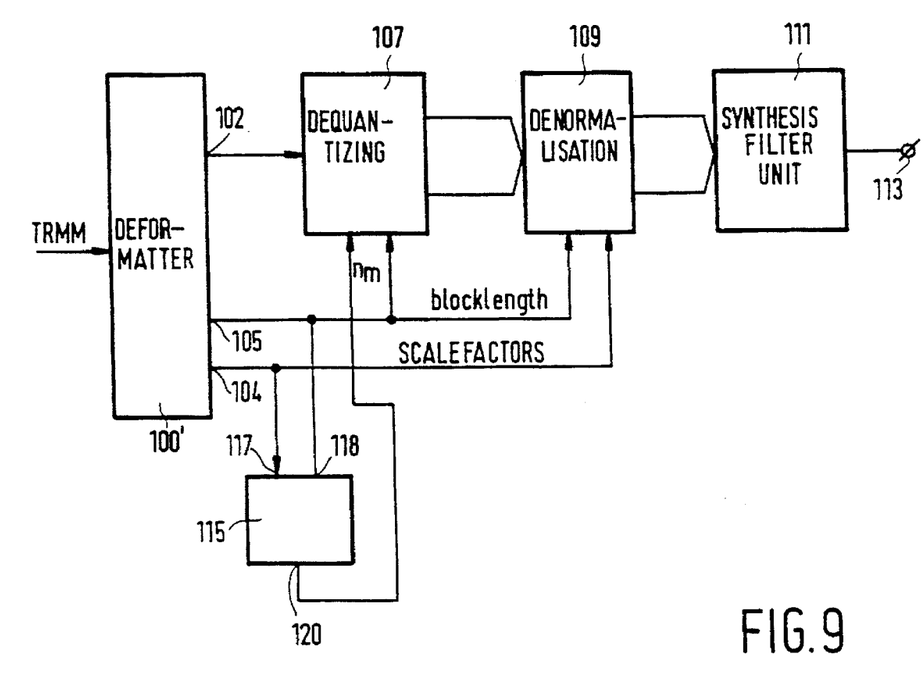

FIG. 9 shows an embodiment of a decoding apparatus for decoding the coded signal transmitted or stored by the encoding apparatus of FIG. 8. The decoding apparatus of FIG. 9 shows large resemblances with the decoding apparatus of FIG. 7, with the difference that the deformatter unit 100' now supplies the dequantized samples at its output 102, the block length information signal at its output 105 and the scale factors for the signal blocks at its output 104. The decoder apparatus further comprises a bitallocation unit 115, which receives the scale factors and the block length information signal via corresponding inputs 117 and 118 respectively. The unit 115 generates the bitallocation information at its output 120. The bitallocation information is supplied to the dequantizing unit 107. The bitallocation unit 115 may function in a way identical to the combination of the units 41' and 48 of FIG. 8.

In the foregoing, the invention has been described with reference to an embodiment in which the wideband signal is split into M subsignals, where M is a constant as a function of time. It may however be possible that, during a specific time interval, M has a specific constant value, leading to constant bandwidths for the narrow bands in the said time interval, and that, during a subsequent time interval M has another (constant) value, leading to other (constant) bandwidths for the narrow bands in the said subsequent time interval. Within each time interval, the method in accordance with the invention can be carried out.

What is claimed:

1. An apparatus for encoding a wideband digital information signal, the apparatus comprising:

an input for receiving the wideband digital information signal, signal splitting means for, during a specific time interval, splitting the wideband digital information signal into M narrow band sub signals, each one of the M sub signals being representative of a component of the wideband digital information signal which is present in a corresponding one of M adjacent narrow bands in the frequency band of the wideband digital information signal, where M is an integer larger than 1 and the narrow bands all have a specific constant bandwidth, scale factor determining means for determining one or more scale factors for subsequent signal blocks in each of the sub signals, quantization means for quantizing the samples in signal blocks into quantized samples in response to bit allocation information supplied to the quantizing means so as to obtain quantized sub signals, bit allocation information deriving means for deriving the bit allocation information, the bit allocation information for a signal block being representative of the number of bits with which samples in a signal block of a sub signal will be represented after quantization in the quantization means, formatting means for combining quantized samples in the signal blocks of the quantized sub signals and scale factors into a digital output signal having a format suitable for transmission or storage, and signal block length determining means for determining the lengths of the signal blocks in at least one of the sub signals and for generating block length information, the block length information being representative of the lengths of the signal blocks in the at least one sub signal, where the lengths of subsequent signal blocks in the at least one sub signal differ, wherein the scale factor determining means is adapted to determine the scale factors for subsequent signal blocks of varying lengths in the at least one sub signal in response to the block length information, the bit allocation information deriving means is adapted to derive bit allocation information for subsequent signal blocks of varying lengths in the at least one sub signal in response to the block length information, the quantization means is adapted to quantize the samples in signal blocks of varying lengths in the at least one sub signal in response to the block length information, and the formatting means is adapted to include the block length information in the digital output signal.

2. The apparatus as claimed in claim 1, wherein the signal block length determining means determines the lengths of the signal blocks in at least two sub signals, and the block length information is representative of the lengths of the signal blocks in the at least two sub signals, where the lengths of subsequent signal blocks in the at least two sub signals differ, whereas time equivalent signal blocks of the at least two sub signals are of the same length.

3. The apparatus as claimed in claim 2, wherein the signal block length determining means determines the lengths of the signal blocks in the M sub signals, and the block length information is representative of the lengths of the signal blocks in the M sub signals, where the lengths of subsequent signal blocks in the M sub signals differ, whereas time equivalent signal blocks of the M sub signals are of the same length.

4. The apparatus as claimed in claim 1, wherein the apparatus is adapted to divide the sub signals into subsequent super signal blocks of equal length, and the signal block length determining means is adapted to divide a super signal block in at least one sub signal into at least two signal blocks.

5. The apparatus as claimed in claim 4, wherein the lengths of the at least two signal blocks included in the super signal block differ.

6. The apparatus as claimed in claim 4, wherein the signal block length determining means is adapted to divide a super signal block in each of at least two sub signals into at least two signal blocks, the super signal blocks in the at least two sub signals being time equivalent and the signal blocks in the time equivalent super signal blocks being time equivalent.

7. The apparatus as claimed in claim 6, wherein the signal block length determining means is adapted to divide M time equivalent super signal blocks, one in each of the M sub signals, into at least two signal blocks, the signal blocks in the time equivalent super signal blocks being time equivalent.

8. The apparatus as claimed in claim 1, wherein the signal block length determining means is adapted to determine the length of subsequent signal blocks in a sub signal such that, in response to the wideband digital information signal, the length of a signal block in the sub signal is relatively longer where the wideband digital information signal from which the signal block has been derived is substantially stationary and is relatively shorter where the wideband digital information signal from which the signal block has been derived has a substantially non-stationary character.

9. The apparatus as claimed in claim 1, wherein the signal block length determining means is adapted to determine the length of subsequent signal blocks in a sub signal such that, in response to the sub signal, the length of a signal block in the sub signal is relatively longer where the sub signal is substantially stationary and is relatively shorter where the sub signal has a substantially non-stationary character.

10. The apparatus as claimed in claim 1, further comprising signal-to-mask ratio determining means for determining a signal-to-mask ratio for each of the M sub signals, and wherein the signal block length determining means is adapted to determine the length of subsequent signal blocks in a sub signal such that, in response to the signal-to-mask ratio for the sub signal, the length of a signal block in the sub signal is relatively longer in the situation where the signal-to-mask ratio for the sub signal as a function of time is substantially stationary and is relatively shorter where the signal-to-mask ratio for the sub signal has a substantially non-stationary character.

11. The apparatus as claimed in claim 1, wherein the formatting means includes recording means for recording the digital output signal on a record carrier.

12. The apparatus as claimed in claim 1, further comprising normalizing means for normalizing the samples in at least one signal block in response to scale factor information for that at least one signal block prior to quantization.

13. An apparatus for decoding a coded digital signal so as to obtain a wideband digital information signal, the apparatus comprising:

receiving means for receiving the coded digital signal, deformatting means for deriving scale factor information and for deriving M quantized sub signals from the coded digital signal, each quantized sub signal being built up of subsequent signal blocks of quantized samples, bit allocation information deriving means for deriving bit allocation information, the bit allocation information for a signal block being representative of the number of bits with which samples in a signal block of a quantized sub signal are represented, dequantization means for dequantizing the quantized samples in response to the bit allocation information so as to obtain M sub signals having dequantized samples, and signal combining means for combining the M sub signals so as to obtain the wideband digital information signal, wherein the deformatting means is adapted to derive block length information from the coded digital signal, the block length information being representative of the lengths of the signal blocks in at least one of the sub signals, where the lengths of subsequent signal blocks in the at least one sub signal differ, the bit allocation information deriving means is adapted to derive bit allocation information for subsequent signal blocks of varying lengths in the at least one sub signal in response to the block length information, and the dequantization means is adapted to dequantize the quantized samples in signal blocks of varying lengths in the at least one sub signal in response to the block length information.

14. The apparatus as claimed in claim 13, further comprising denormalization means for denormalizing the samples in the signal blocks of the sub signals, in response to the scale factor information and the block length information, prior to signal combining in the signal combination means.

15. The apparatus as claimed in claim 13, wherein the receiving means includes reproducing means for reproducing the coded digital signal from a record carrier.

16. A method of encoding a wideband digital information signal, the method comprising the steps of:

receiving the wideband digital information signal, during a specific time interval, splitting the wideband digital information signal into M narrow band sub signals, each one of the M sub signals being representative of a component of the wideband digital information signal which is present in a corresponding one of M adjacent narrow bands in the frequency band of the wideband digital information signal, where M is an integer larger than 1, determining one or more scale factors for subsequent signal blocks in each of the sub signals, quantizing the samples in signal blocks into quantized samples in response to bit allocation information so as to obtain quantized sub signals, deriving the bit allocation information, the bit allocation information for a signal block being representative of the number of bits with which samples in a signal block of a sub signal will be represented after quantization, combining the quantized samples in the signal blocks of the quantized sub signals and the scale factors into a digital output signal having a format suitable for transmission or storage, and determining the lengths of the signal blocks in at least one of the sub signals and generating block length information, the block length information being representative of the lengths of the signal blocks in the at least one sub signal, where the lengths of subsequent signal blocks in the at least one sub signal differ, wherein the scale factor determining step includes determining the scale factors for subsequent signal blocks of varying lengths in the at least one sub signal in response to the block length information, the bit allocation information deriving step includes deriving bit allocation information for subsequent signal blocks of varying lengths in the at least one sub signal in response to the block length information, the quantizing step includes quantizing the samples in signal blocks of varying lengths in the at least one sub signal in response to the block length information, and the combining step includes including the block length information in the digital output signal.

17. The method as claimed in claim 16, wherein the quantization step includes normalizing the samples in at least one signal block, in response to scale factor information for the at least one signal block, prior to quantization.

18. The method as claimed in claim 16, further comprising recording the digital output signal on a record carrier.

19. A method of decoding a coded digital signal so as to obtain a wideband digital information signal, the method comprising the steps of:

receiving the coded digital signal, obtaining M quantized sub signals from the coded digital signal, each quantized sub signal being built up of subsequent signal blocks of quantized samples, deriving bit allocation information, the bit allocation information for a signal block being representative of the number of bits with which samples in a signal block of a quantized sub signal are represented, dequantizing the quantized samples in response to the bit allocation information so as to obtain M sub signals having dequantized samples, and combining the M sub signals so as to obtain the wideband digital information signal, wherein the obtaining step includes obtaining block length information from the coded digital signal, the block length information being representative of the lengths of the signal blocks in at least one of the sub signals, where the lengths of subsequent signal blocks in the at least one sub signal differ, the deriving step includes deriving bit allocation information for subsequent signal blocks of varying lengths in the at least one sub signal in response to the block length information, and the dequantization step includes dequantizing the quantized samples in signal blocks of varying lengths in the at least one sub signal in response to the block length information.

20. The method as claimed in claim 19, wherein the coded digital signal is received from a record carrier.

* * * * *